(12) United States Patent
Becker (10) Patent No.: US 12,457,464 B2
(45) Date of Patent: Oct. 28, 2025

(54) ARTIFACT REDUCTION ON TRANSITIONS BETWEEN AUDIO TRACKS

(71) Applicant: Apple Inc., Cupertino, CA (US)

(72) Inventor: François Becker, Essonne (FR)

(73) Assignee: APPLE INC., Cupertino, CA (US)

( * ) Notice: Subject to any disclaimer, the term of this patent is extended or adjusted under 35 U.S.C. 154(b) by 392 days.

(21) Appl. No.: 18/058,431

(22) Filed: Nov. 23, 2022

(65) Prior Publication Data

US 2024/0171926 A1    May 23, 2024

(51) Int. Cl.
*H04S 7/00* (2006.01)
*H04S 1/00* (2006.01)

(52) U.S. Cl.
CPC .............. *H04S 7/30* (2013.01); *H04S 1/007* (2013.01); *H04S 2400/09* (2013.01)

(58) Field of Classification Search
CPC ........ H04S 7/30; H04S 1/007; H04S 2400/09; H04R 3/00; G11B 27/031; G11B 27/34; H04N 21/233; G06F 3/165; G06F 17/00
USPC ......................................................... 700/94
See application file for complete search history.

(56) References Cited

U.S. PATENT DOCUMENTS

| | | | | |
|---|---|---|---|---|
| 4,591,928 A | * | 5/1986 | Bloom | G11B 27/10 360/13 |
| 2008/0077262 A1 | * | 3/2008 | Davis | G11B 27/038 700/94 |
| 2018/0288558 A1 | * | 10/2018 | Umminger, III | H04S 7/303 |
| 2021/0043174 A1 | * | 2/2021 | Radin | G10H 1/0041 |

OTHER PUBLICATIONS

WaveLab Elements 9—Operation Manual [online]. Steinberg Media Technologies GmbH, 2016 [archived on web.archive.org on Jan. 10, 2017]. Retrieved from the internet <URL: https://web.archive.org/web//https://download.steinberg.net/downloads_software/WaveLab_Elements_9/9> (Year: 2016).*

Fade and Crossfade—Audacity Reference Manual [online]. The Audacity Team, 2016 [archived on web.archive.org on Apr. 22, 2016]. Retrieved from the internet <URL: https://web.archive.org/web/20160422000550/https://manual.audacityteam.org/man/fade_and_crossfade.html> (Year: 2016).*

* cited by examiner

*Primary Examiner* — Fan S Tsang
*Assistant Examiner* — Sean M Rinehart
(74) *Attorney, Agent, or Firm* — BakerHostetler (57) ABSTRACT

An audio artifact reduction technique operates on a pair of temporally-adjacent audio tracks. Samples at an end portion of a first track may be altered according to an inter-track sample discontinuity at a boundary between the two tracks. Samples at a beginning portion of a second track also may be altered according to the inter-track discontinuity. These altering operations may cause the sample values and the end of the first track and the beginning of the second track to be equal to each other at the boundary between the two tracks. In one aspect, the altering may generate adjustment curves that alter sample values of the tracks around the boundary between them. In another aspect, the altering may trim the tracks at zero crossings of track sample values nearest to the boundary between the tracks.

18 Claims, 6 Drawing Sheets

ARTIFACT REDUCTION ON TRANSITIONS BETWEEN AUDIO TRACKS

BACKGROUND

The present disclosure is directed to processing of audio tracks in which discontinuities between temporally-adjacent tracks can create audible artifacts in rendering. In one application, the techniques proposed herein apply to spatial audio rendering applications, where audio is rendered to provide an effect of virtual sound sources in a three-dimensional space around the listener.

Audio processing often requires application of filtering and other processing operations (such as convolution or recursive digital filters) to a source audio sequence. For example, it may transform non-spatial audio content to provide an effect that sound appears to emanate from a point in a 3-D space. It often requires processing of the audio content according to metadata that represents source content properties (for example, the source's position relative to a listener and the kind of reverberation associated with it) and with consideration of the electroacoustic properties of the transducer(s) (e.g., headphones, stereo speakers, multichannel speakers, and the like) that will render the audio. Spatial audio processing operations can create artifacts and discontinuities at the boundaries between content elements (called "tracks," for convenience). These audio artifacts tend to be particularly noticeable for so-called "gapless" audio, which is made of continuous audio that extends between tracks. When these artifacts are rendered, they degrade listeners' perceived quality of the audio.

DETAILED DESCRIPTION

Aspects of the present disclosure provide an audio artifact reduction method that operates on a pair of temporally-adjacent audio tracks. According to the method, samples at an end portion of a first track may be altered according to an inter-track sample discontinuity at a boundary between the two tracks. Samples at a beginning portion of a second track also may be altered according to the inter-track discontinuity. These altering operations may cause the sample values and the end of the first track and the beginning of the second track to be equal to each other at the boundary between the two tracks or sufficiently close to each other to mitigate artifacts.

The inventor determined that audio artifacts often arise due to application of various audio processing algorithms that are sensitive to the input discontinuities at the track boundaries. These algorithms can generate signal discontinuities at the start and the end of the track due to pre-ringing and "tails" that are generated by the filters within these audio processing algorithms. As discussed below, the input and output signals may be manipulated at the track boundaries to reduce the artifacts or even achieve seamless audio transitions between tracks.

Figure 1:
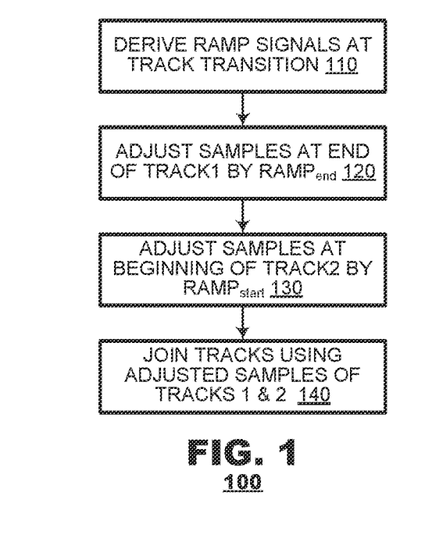
FIG. 1 illustrates a method according to an aspect of the present disclosure.

FIG. 1 illustrates a method 100 according to an aspect of the present disclosure, which finds application in a transition between first and second segments of an audio track where it is desired to reduce audible artifacts. The method 100 may derive ramp signals at a transition between tracks (box 110). The method 100 may adjust samples of a first track leading into to the transition according to a ramp signal (ramp$_{end}$) derived for the first track (box 120). The method may adjust samples of a second track commencing at the transition according to a second ramp signal (ramp$_{start}$) derived for the second track (box 130). The method 100 may join the tracks at the transition using adjusted samples from the first and second tracks obtained at boxes 120 and 130 (box 140).

Figure 2:
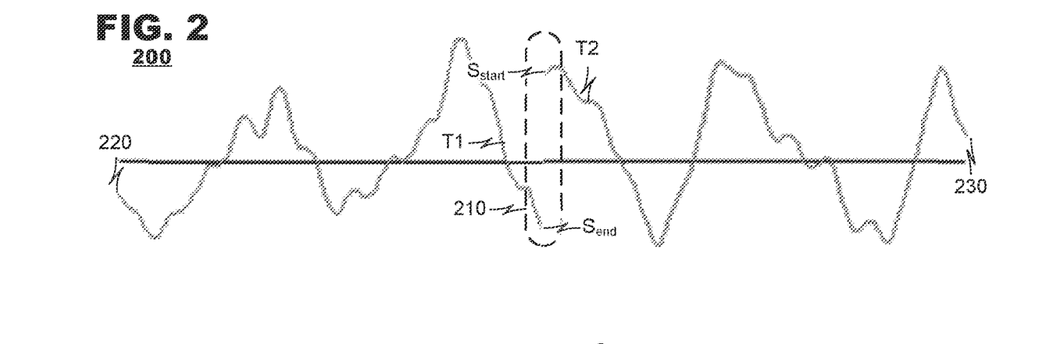
FIG. 2 illustrates an exemplary pair of tracks that may exhibit audio artifacts when played consecutively by an audio rendering application.

FIGS. 2-5 illustrate application of the method 100 to samples of an exemplary pair of tracks T1 and T2. FIG. 2 illustrates a transition 210 that would occur between these tracks T1 and T2 if they were placed adjacent to each other in an audio sequence without application of the method 100. A discontinuity exists between these tracks T1 and T2 that arises because a sample S$_{end}$ at an end of track T1 and a sample S$_{start}$ at the start of the next track T2 have different values. This discontinuity can lead to audible artifacts when the tracks T1 and T2 are combined into a continuous audio stream that is rendered.

Figures 3, 4, 5:
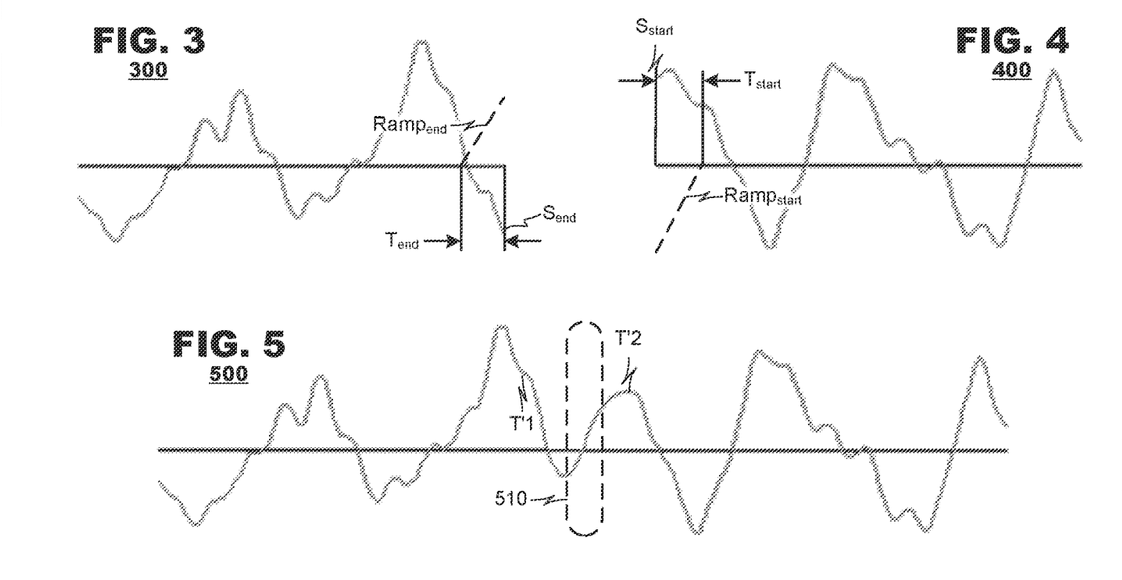
FIG. 3 illustrates application of the method of FIG. 1 to an exemplary first track.
FIG. 4 illustrates application of the method of FIG. 1 to an exemplary second track.
FIG. 5 illustrates the exemplary pair of tracks from FIG. 2 after application of the method of FIG. 1.

FIG. 3 illustrates application of the method 100 to the first track T1 in this example. A ramp signal R$_{end}$ may be derived for a predetermined temporal window T$_{end}$ at the end of the track that extends from a zero value at onset of the window T$_{end}$ to a value that has the same magnitude but opposite sign as the sample S$_{end}$ at the end of the track T1 (e.g., −S$_{end}$).

FIG. 4 illustrates application of the method 100 to the second track T2 in this example. Another ramp signal R$_{start}$ may be derived for a predetermined temporal window $T_{start}$ at the start of the second track that has a value with has the same magnitude but opposite sign as the sample $S_{start}$ at the start of the track T2 (e.g., $-S_{start}$) and transitions to a zero value at the end of the window $T_{start}$.

According to the method 100, samples of the two tracks T1 and T2 may be adjusted by their respective ramp signals $R_{end}$ and $R_{start}$. FIG. 5 illustrates application of the adjustments to the tracks T1 and T2, yielding adjusted tracks T'1 and T'2. When these tracks are placed in an audio stream, a signal continuity is created at samples at a transition 510 between these adjusted tracks T'1 and T'2, which can reduce artifacts when the stream is rendered.

Figure 6:
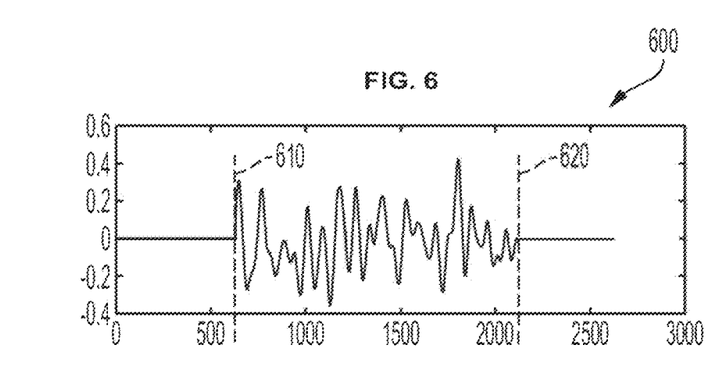
FIG. 6 illustrates an exemplary track that may give rise to audio artifacts.
Figure 7:
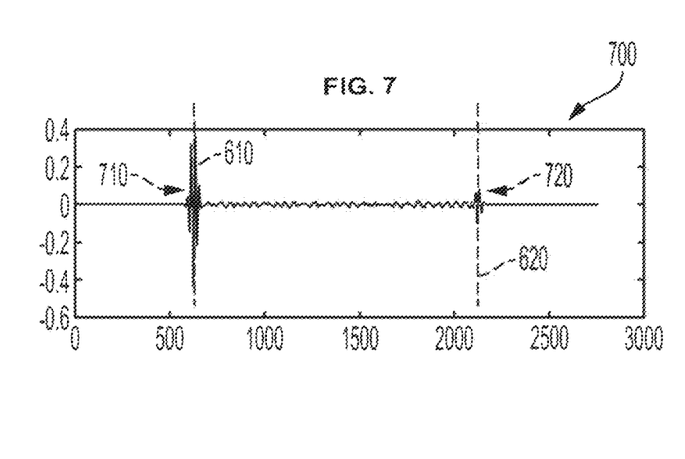
FIG. 7 illustrates a convolution of the exemplary track from FIG. 6 with an impulse response.

The method 100 of FIG. 1 is expected to avoid creation of artifacts that can occur due to convolution processing and other filtering that generate signal content beyond track boundaries. One illustration of these artifacts is shown in FIG. 6 below, where a single track 600 extends from a track start 610 to a track end 620. FIG. 7 illustrates a convolution 700 of the track 600 from FIG. 6 with an impulse response. The response of the discontinuities is strong since discontinuities, like step functions, are spectrally-rich.

Figure 8:
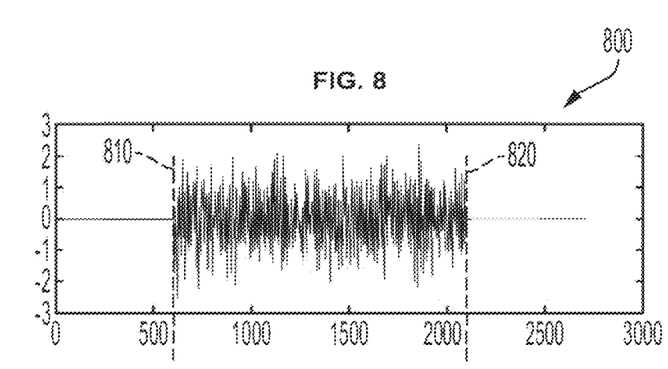
FIG. 8 illustrates another exemplary track that may give rise to audio artifacts.
Figure 9:
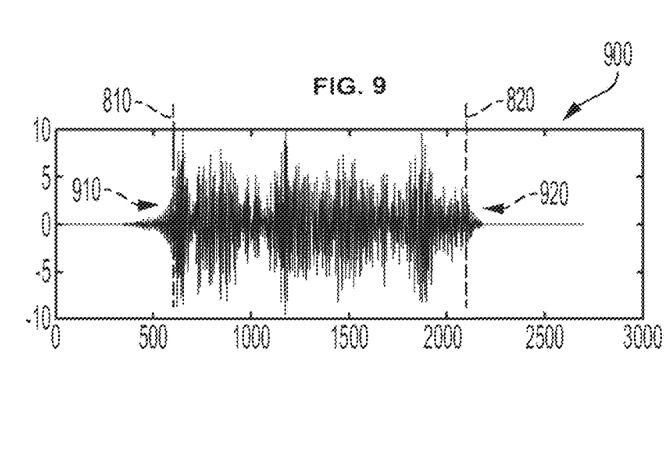
FIG. 9 displays the convolution of the exemplary track from FIG. 8 with a non-causal impulse response.

Another example is shown in FIGS. 8 and 9. This example considers a track 800 (FIG. 8) from spatial audio processed by spatial audio rendering, which may include various filtering algorithms (e.g., a Head Related Transfer Function, room effect transforms, etc.), their pre-ringings (audio is latency compensated), and tails (broadband artifacts). FIG. 9 displays the convolution of the top signal with a non-causal impulse response. As in the prior example, the track 900 after processing could have its first samples 910 and its last samples 920 beyond the boundaries 810, 820 of the pre-processed track 800. A non-causality originates from the latency compensation, i.e. compensation of the group delay to align output signal in time with input signal. The signal discontinuities at the track boundaries can cause a tail of the rendering artifact to be audible at the beginning of the track and pre-ringing of the rendering artifact at the end of the track to be audible.

It is expected that application of the method 100 will mitigate artifacts that occur when sample level discontinuities occur between two temporally-adjacent tracks and they are processed by spatial audio rendering techniques.

In practice, application of the ramp signals $Ramp_{end}$, $Ramp_{start}$ impose their own distortions to rendered audio. The durations $T_{end}$ and $T_{start}$ and the profiles of the ramps $Ramp_{end}$, $Ramp_{start}$ may be tailored to suit individual application needs. For example, rather than apply linear ramps as shown in FIGS. 3 and 4, the ramps $Ramp_{end}$, $Ramp_{start}$ may have a sinusoidal profile (not shown) having a period of twice the respective durations $T_{end}$ and $T_{start}$. Applying a sinusoidal profile tends to restrict audio distortions to low power and relatively low frequencies. For example, for audio at a 48 kHz sampling rate, a sinusoidal ramp signal applied over 512 samples tends to restrict induced audible distortion artifacts to frequencies at 46 Hz at power low enough to be effectively inaudible in commercial rending devices.

The principles of the present disclosure find application where content transitions create sample discontinuities at the beginnings or ends of content tracks. The example of FIGS. 2-5 illustrates application to a single content transition that occurs between a pair of tracks T1, T2 that are temporally adjacent to each other in a continuous audio stream. Although not illustrated in this example, other iterations of the method 100 may be applied to the beginning of track T1 and to the end of track T2 if sample discontinuities are presented there, also.

Additionally, the principles of FIG. 1 may be applied at the beginning or the end of a rendering session, as desired, where artifacts may arise. For example, if track T1 were the very first track to be rendered in an audio rendering session, a discontinuity may be created at the beginning of the track where the session transitions from silence (virtually, a zero-valued "track") to the beginning of track T1. Application of the method 100 would cause a ramp (not shown in FIGS. 2-5) to be applied to the beginning of track T1, which may reduce audible artifacts.

Similarly, if track T2 were the very last track to be rendered in an audio rendering session, a discontinuity may be created at the end of the track T2 where the session transitions from track T2 to silence (again, a virtual zero-valued track). Application of the method 100 would cause a ramp (also not shown in FIGS. 2-5) to be applied to the end of track T2, which may reduce audible artifacts.

The principles of the present disclosure find application with ramp signals having a variety of shapes. In the example of FIGS. 3 and 4, the ramps $Ramp_{end}$ and $Ramp_{start}$ are shown as linear segments having constant slopes. In practice, other ramp shapes may be applied such as ramps having piecewise-linear shape, curved shapes, curvilinear shapes, asymptotic shapes, and the like.

Figure 10:
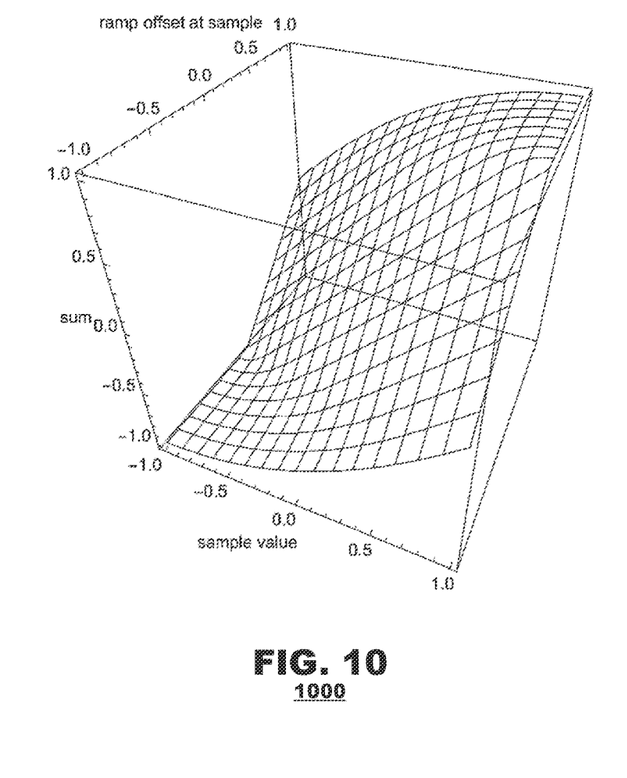
FIG. 10 illustrates an exemplary limiting function that, in an aspect of the present disclosure, may be applied during operation of the method of FIG. 1.

It may occur that application of a ramp signal causes track samples to exceed predetermined limit values (e.g., minimum and/or maximum values) that are valid for the samples. Aspects of the present disclosure may apply limiting functions to samples as they are added to ramp values to bring them within applicable limit values. FIG. 10 illustrates an exemplary relationship between source samples, ramp sample values and the resultant sums obtained therefrom as the ramp is applied. When adjustment by a ramp signal otherwise might cause a minimum or maximum limit to be exceeded, the sum may be limited to occur within the respective limit.

Figure 11:
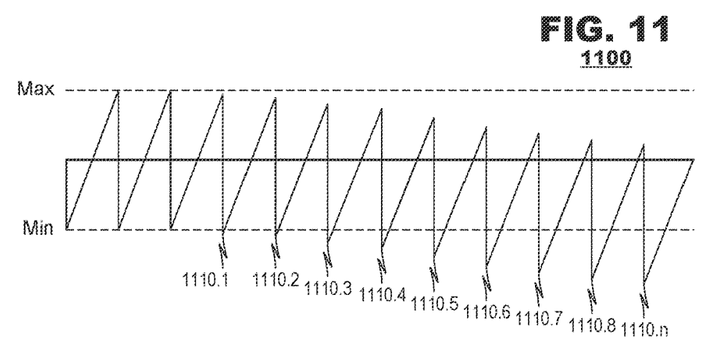
FIG. 11 illustrates an exemplary waveform that may be generated by an initial application of a ramp signal according to FIG. 1.
Figure 12:
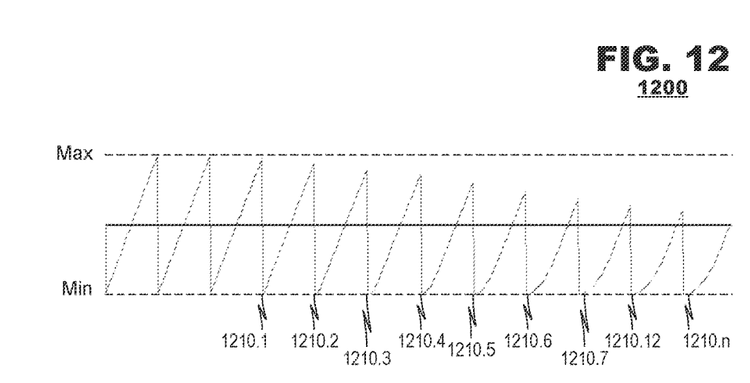
FIG. 12 illustrates an exemplary waveform that may be generated by application of a limiting function according to an aspect of the present disclosure.

FIGS. 11 and 12 illustrate this concept as applied to an exemplary waveform. In this example, source samples follow a sawtooth profile that oscillates between a maximum limit and a minimum limit. FIG. 11 illustrates a waveform 1100 that may be generated by an initial application of a ramp signal. As illustrated, portions of the waveform 1110.1-1110.$n$ have sample values that fall below the minimum limit. FIG. 12 illustrates the waveform of FIG. 11 after application of a limiting factor. As illustrated, the waveform 1200 is contained entirely within the minimum and maximum limits defined for these samples. The portions of the waveform 1210.1-1210.$n$ that correspond to those portions 1110.1-1110.$n$ (FIG. 11) that exceeded the minimum limit are shown modified according to the transform illustrated in FIG. 10.

Figure 13:
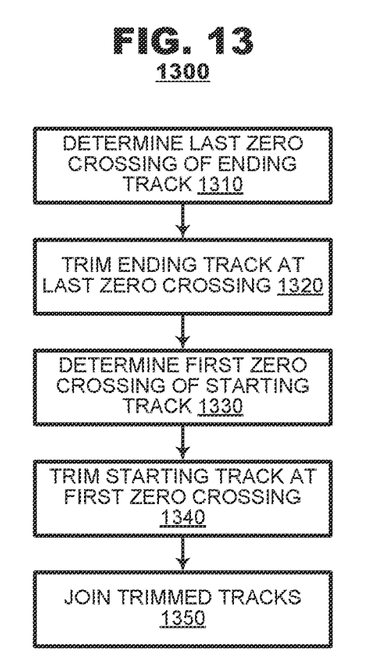
FIG. 13 illustrates a method according to another aspect of the disclosure.

FIG. 13 illustrates a method 1300 according to another aspect of the disclosure, which finds application in a transition between first and second segments of an audio track where it is desired to reduce audible artifacts. The method 1300 may determine a last zero crossing of content in a first track (box 1310) and may trim the first track at the point of the last zero crossing (box 1320). The method 1300 may determine a first zero crossing of content in a second track (box 1330) and may trim the second track at the point of the first zero crossing (box 1340). Thereafter, the method 1300 may join the trimmed tracks in a continuous audio sequence (box 1350), which may be used for rendering.

Figure 14:
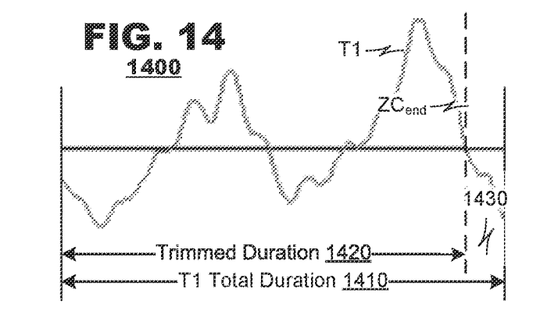
FIG. 14 illustrates application of the method of FIG. 13 to an exemplary first track.
Figure 15:
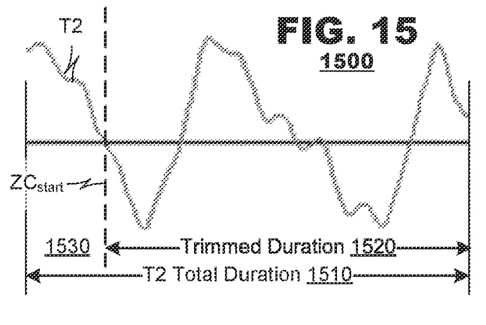
FIG. 15 illustrates application of the method of FIG. 13 to an exemplary second track.
Figure 16:
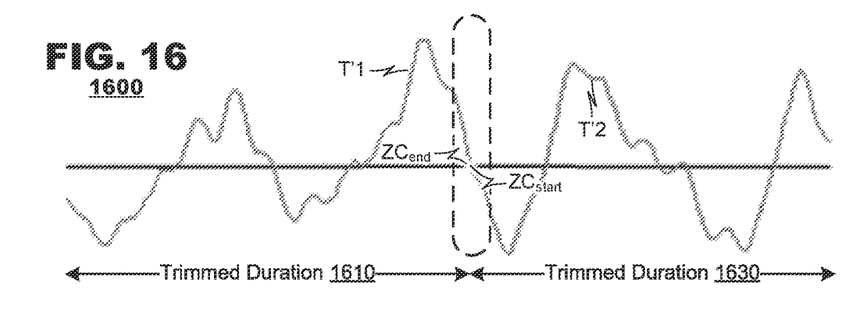
FIG. 16 illustrates the exemplary pair of tracks from FIG. 2 after application of the method of FIG. 13.

FIGS. 14-16 illustrate application of the method 1300 to the exemplary tracks T1, T2 shown in FIG. 2. As discussed, if the tracks T1 and T2 were placed adjacent to each other in an audio sequence without corrective action, a discontinuity would occur at a transition 210 between these tracks T1 and T2 because a sample S end at an end of track T1 and a sample $S_{start}$ the start of the next track T2 are so far apart that the conjunction of tracks creates a signal discontinuity instead of a continuous signal variation. This discontinuity can lead to audible artifacts during rendering.

FIGS. 14 and 15 illustrate application of the method 1300 to these exemplary tracks T1 and T2. In FIG. 14, a final zero crossing of track T1 is identified occurring at location $ZC_{end}$. When the track T1 is trimmed, the trim operation reduces the track's duration from a prior total duration 1410 to a trimmed duration 1420. A trimmed portion 1430 of track T1 may be discarded.

In FIG. 15, a first zero crossing of track T2 is identified occurring at location $ZC_{start}$. When the track T2 is trimmed, the trim operation reduces the track's duration from a prior total duration 1510 to a trimmed duration 1520. A trimmed portion 1530 of track T2 may be discarded.

FIG. 16 illustrates a resultant audio sequence that may be generated from trimmed tracks T'1 and T'2. The trimmed tracks T'1 and T'2 may have the trimmed durations 1420, 1520 illustrated in FIGS. 14 and 15. Thus, operation of the method 1300 of FIG. 13 may alter the overall duration of rendered audio from the duration of source audio. In this regard, the method 1300 may be inappropriate for certain rendering applications, for example, in multi-track audio content where individual tracks exhibit zero crossings at different times from other tracks that are to be rendered in parallel with other tracks (e.g., multi-channel audio). Thus, while the method 1300 of FIG. 13 is expected to mitigate audible artifacts that may arise due to discontinuities in temporally-adjacent tracks, application of the method 1300 should consider the likelihood of other artifacts that may be introduced.

Figure 17:
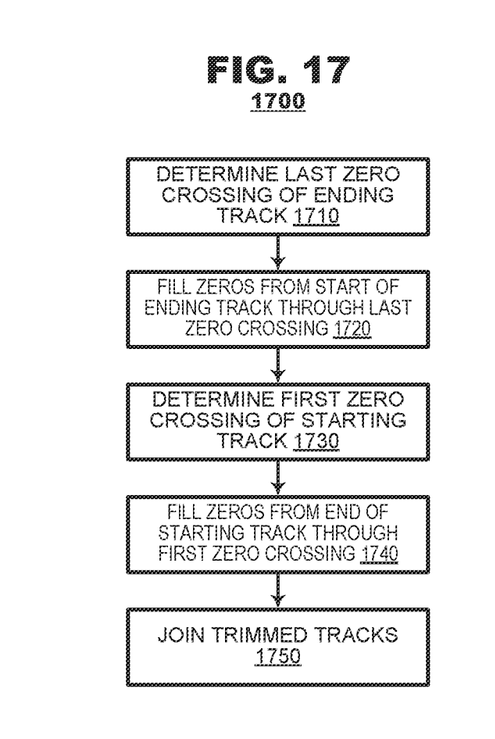
FIG. 17 illustrates a method according to another aspect of the disclosure.

FIG. 17 illustrates a method 1700 according to another aspect of the disclosure, which finds application in a transition between first and second segments of an audio track where it is desired to reduce audible artifacts. The method 1700 may determine a last zero crossing of content in a first track (box 1710) and may replace content from the end of the first track through to the point of the last zero crossing with null-valued samples (box 1720), effectively filling that portion of the first track with zeros. The method 1700 may determine a first zero crossing of content in a second track (box 1730) and may replace content from the start of the second track through to the point of the first zero crossing with zero-valued samples (box 1740), again, filling that portion of the second track with zeros. Thereafter, the method 1700 may join the trimmed tracks in a continuous audio sequence (box 1750), which may be used for rendering.

The method 1700 of FIG. 17 may mitigate artifacts by replacing samples that lead to track discontinuities with zero valued samples. As compared to the method 1300 of FIG. 13, the method 1700 need not alter the durations of the tracks, which may lead to simpler synchronization of operation when multi-track audio is to be played.

Figure 18:
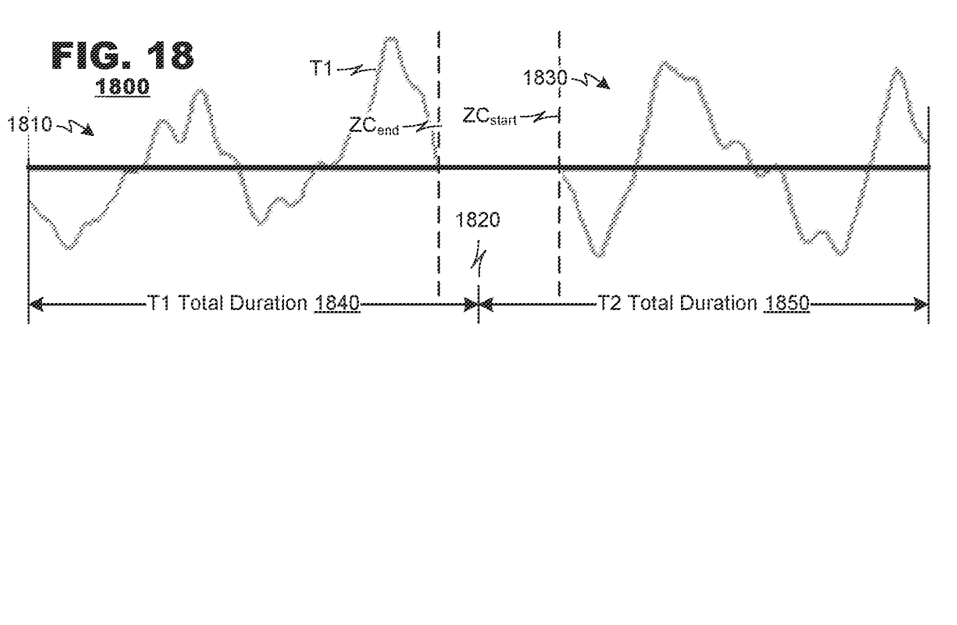
FIG. 18 illustrates the exemplary pair of tracks from FIG. 2 after application of the method of FIG. 17.

FIG. 18 illustrates operation of the method 1700 as applied to the exemplary tracks 1400, 1500 of FIGS. 14 and 15. In this example, content from the last zero crossing $ZC_{end}$ of the first track 1810 to the track's endpoint 1820 may be replaced with zero-valued samples. Similarly, content from the starting point 1820 of the second track 1830 to the first zero crossing $ZC_{start}$ may be replaced with zero-valued samples. The durations 1840, 1850 of the first and second tracks are unchanged.

Figure 19:
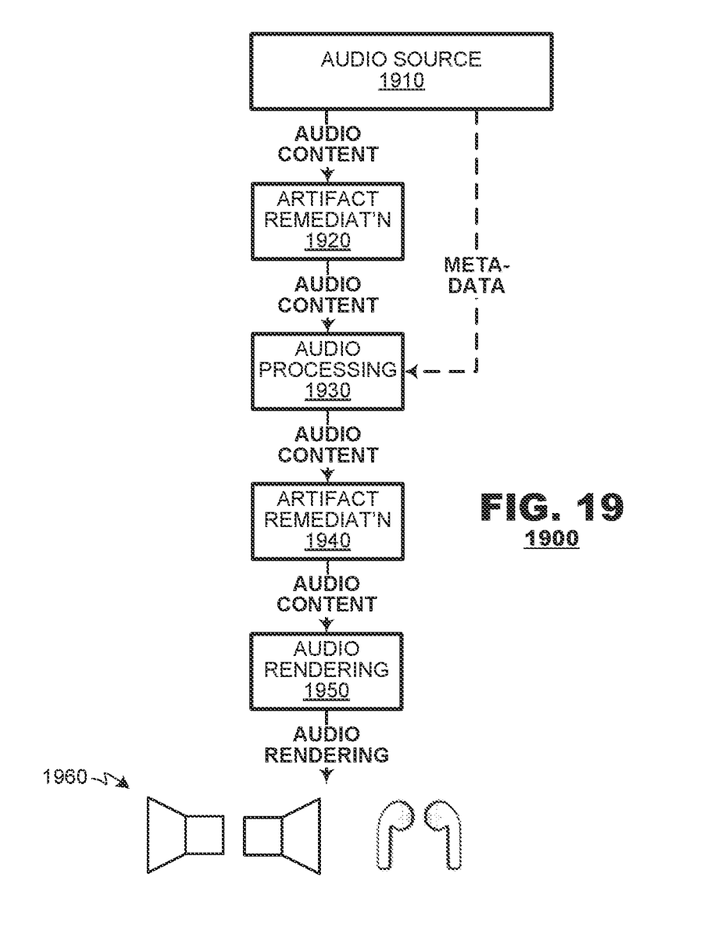
FIG. 19 illustrates an exemplary distribution chain for audio content.

The principles of the present disclosure may be applied several times as desired in audio distribution chains to combat artifacts imposed by audio processing. FIG. 19 illustrates an exemplary audio distribution chain 1900 where an audio source 1910 generates audio content that, ultimately, will be rendered on one or more rendering devices 1960. Oftentimes, the audio source 1910 generates audio in a generic manner, e.g., it is not tailored for the electroacoustic properties of any particular rendering device. The audio content may be processed by intermediate processing stages 1930, 1950 as the audio content progresses through a distribution chain from the audio source 1910 to the rendering devices 1960, which may perform filtering operations and other processing operations described above to prepare the audio content for rendering. Spatial audio processing is one such example of intermediate processing 1930, where the intermediate processing stage 1930 processes the audio content and metadata supplied by the audio source 1910 to generate processed audio content that emulates sound emanating from point(s) in a 3-D space. FIG. 19 illustrates an audio rendering stage 1950 where processed audio content is converted to audio rendering signals and that drive transducers in the rendering devices 1960.

In such applications, the artifact remediation techniques described hereinabove may be applied at one or more processing stages within the audio distribution chain 1900. It is proposed to apply artifact remediation at a stage 1940 immediately prior to rendering processing 1950. In this manner, artifacts that may arise due to track discontinuities may be remedied. It also may occur that the artifact remediation techniques described hereinabove may be applied earlier in the distribution chain, such as an intermediate stage 1920, following stage(s) that may generate audio with inter-track discontinuities. For example, FIG. 19 illustrates an artifact remediation stage 1920 following creation of audio content by the audio source 1910. It often occurs that different commercial entities will control different processing stages 1910, 1930, 1950 in an audio distribution chain 1900; applying artifact remediation at different stages 1920, 1940 within the distribution chain 1900 may contribute to a perception that the audio content generated by these entities has improved perceptual quality.

In such applications, different artifact remediation stages 1920, 1940 may apply the same or different instances of the remediation techniques described hereinabove. For example, in one aspect, both stages 1920, 1940 may apply the method of FIG. 1. In another aspect, one stage (say, stage 1920) may apply the method of FIG. 1 while the other stage 1940 applies the method of FIG. 13. It is expected that system designers will select the technique to be applied in a given stage 1920, 1940 to suit their individual application needs.

FIGS. 2-9 and 14-16 have presented application of the methods of FIGS. 1 and 13 techniques to a single pair of exemplary track in order to illustrate the principles of these aspects of the present disclosure. In application, audio tracks typically include content contained in multiple channels, each of which includes its own audio content. The principles of the present disclosure, of course, find application with multi-channel audio content; in such instances, the proposed techniques may be applied to track boundaries of each channel in independent instances of the disclosed methods.

The foregoing discussion has presented aspects of the present disclosure as performed by artifact remediation stages 1920, 1940. In application, these remediation stages may be embodied by processing devices. The processing devices may include consumer electronic devices such as media players, entertainment centers, set top boxes, smart speakers, personal computers, notebook computers, tablet computers, mobile phones, and/or gaming consoles. These processing devices also may include server computers and media production equipment. In such applications, the processing devices may include a processor and a memory. The memory may store instructions that, when executed by the processor, perform the methods and techniques described hereinabove. The memory, of course, also may store the audio content that are to be processed by the artifact remediation techniques described hereinabove. The memory may include semiconductor-, magnetic-, and/or optical-based storage media for storage of program instructions and/or audio content.

The artifact remediation stages 1920, 1940 may include communication hardware for exchange of audio content with other processing devices. The communication hardware, for example, may include a wired network interface (e.g., an Ethernet interface) to effectuate communication over a wired communication channel. As another example, the communication hardware may comprise a wireless interface, such as a radio transceiver, to effectuate communication over a wireless communication channel. Such a wireless communication channel may include a cellular network or a Wi-Fi network. Audio content exchange may occur via the Internet.

The artifact remediation stages 1920, 1940 described herein may be implemented in software, such as one or more of applications of a processing device or as part of the processing device's operating system. Additionally or alternatively, the systems, methods, and techniques described herein may be implemented in dedicated hardware components such as application specific integrated circuits, field programmable gate arrays and/or digital signal processors. Further, these components may be provided as hybrid systems that distribute functionality across dedicated hardware components and programmed general purpose processors, as desired.

Several aspects of the disclosure are specifically illustrated and/or described herein. However, it will be appreciated that modifications and variations of the disclosure are covered by the above teachings and within the purview of the appended claims without departing from the spirit and intended scope of the disclosure.

I claim:

1. An audio artifact reduction method, comprising, at a pair of temporally-adjacent audio tracks:
    altering samples at an end portion of a first track according to an inter-track sample discontinuity at a boundary between the pair of temporally-adjacent audio tracks by deriving an adjustment curve based on a sample value at a terminal end of the first track, and applying the adjustment curve to samples of the first track in the end portion, and
    altering samples at a beginning portion of a second track according to the inter-track discontinuity by deriving an adjustment curve based on a sample value at a terminal start of the second track, and applying the adjustment curve to samples of the second track in the beginning portion,
    wherein the first and second altering steps cause sample values at the end of the first track and the beginning of the second track to be equal at the boundary between the two tracks.

2. The method of claim 1, wherein the sample values at the end of the first track and the beginning of the second track both are zero.

3. The method of claim 1, wherein the adjustment curve has a value at the terminal end of the first track that is equal in magnitude but opposite in sign to the sample value at a terminal end of the first track.

4. The method of claim 1, further comprising, applying a limiting function to the adjustment curve prior to the applying step when application of an unlimited adjustment curve would cause adjusted sample value(s) of the first track to exceed a limit value for such samples.

5. The method of claim 1, wherein the adjustment curve has a value at the terminal start of the second track that is equal in magnitude but opposite in sign to the sample value at the terminal start of the second track.

6. The method of claim 1, further comprising, applying a limiting function to the adjustment curve prior to the applying step when application of an unlimited adjustment curve would cause adjusted sample value(s) of the second track to exceed a limit value for such samples.

7. The method of claim 1, wherein the altering comprises, for the first track, replacing sample values in an end portion of the first track that extends from a sample location corresponding to final zero crossing to an end of the first track with zero values.

8. The method of claim 1, wherein the altering comprises, for the second track, replacing sample values in a starting position of the second track that extends from a sample location corresponding to the beginning of the second track to a first zero crossing of the second track with zero values.

9. The method of claim 1, wherein the first and second audio tracks are generated by a spatial audio processing algorithm.

10. An audio artifact reduction method, comprising:
    for a first track of a pair of temporally-adjacent audio tracks:
        deriving a first adjustment curve based on a sample value at a terminal end of the first track, and
        applying the first adjustment curve to samples of the first track in the terminal end portion; and
    for a second track of the pair of temporally-adjacent audio tracks:
        deriving a second adjustment curve based on a sample value at a terminal start of the second track, and
        applying the second adjustment curve to samples of the second track in the start portion.

11. The method of claim 10, wherein, following the applying steps, an altered sample value at the terminal end of the first track and an altered sample value at terminal start of the second track have the same magnitude.

12. The method of claim 10, wherein the first adjustment curve has a value at the terminal end of the first track that is equal in magnitude but opposite in sign to the sample value at the terminal end of the first track.

13. The method of claim 10, wherein the second adjustment curve has a value at the terminal start of the second track that is equal in magnitude but opposite in sign to the sample value at the terminal start of the second track.

14. The method of claim 10, further comprising, applying a limiting function to adjusted sample value(s) when application of an unlimited adjustment curve would cause adjusted sample value(s) of the second track to exceed a limit value for such samples.

15. A system, comprising:
a processor, and
a memory system storing program instructions that, when executed by the processor, cause the processor to perform an artifact reduction method for a pair of temporally-adjacent audio tracks, comprising:
  first altering samples at an end portion of a first track according to an inter-track sample discontinuity at a boundary between the two tracks, by:
    deriving a first adjustment curve based on a sample value at a terminal end of the first track, and
    applying the first adjustment curve to samples of the first track in the end portion; and
  second altering samples at a beginning portion of a second track according to the inter-track discontinuity, by:
    deriving a second adjustment curve based on a sample value at a terminal start of the second track, and
    applying the second adjustment curve to samples of the second track in the beginning portion,
  wherein the altering steps cause the sample values at the end of the first track and the beginning of the second track to be equal at the boundary between the two tracks.

16. The system of claim 15, further comprising a rendering device having an input for audio rendering signals generated from the artifact reduction method.

17. The system of claim 15, wherein the method further stores program instructions of a spatial audio rendering method that generate the temporally-adjacent audio tracks.

18. Computer readable memory storing program instructions that, when executed by a processing device, cause the processing device to perform an artifact reduction method for a pair of temporally-adjacent audio tracks, comprising:
  first altering samples at an end portion of a first track according to an inter-track sample discontinuity at a boundary between the two tracks by:
    deriving a first adjustment curve based on a sample value at a terminal end of the first track, and
    applying the first adjustment curve to samples of the first track in the end portion; and
  second altering samples at a beginning portion of a second track according to the inter-track discontinuity by:
    deriving a second adjustment curve based on a sample value at a terminal start of the second track, and
    applying the second adjustment curve to samples of the second track in the beginning portion,
  wherein the altering steps cause the sample values at the end of the first track and the beginning of the second track to be equal at the boundary between the two tracks.

* * * * *